United States Patent
Xue et al.

(10) Patent No.: US 11,794,348 B2
(45) Date of Patent: Oct. 24, 2023

(54) PROCESS ASSEMBLY LINE WITH ROBOTIC PROCESS AUTOMATION

(71) Applicant: SAP SE, Walldorf (DE)

(72) Inventors: Du Xue, Shanghai (CN); Tao Chen, Shagnhai (CN); Zeping Chen, Shanghai (CN)

(73) Assignee: SAP SE, Walldorf (DE)

(*) Notice: Subject to any disclaimer, the term of this patent is extended or adjusted under 35 U.S.C. 154(b) by 183 days.

(21) Appl. No.: 17/387,701

(22) Filed: Jul. 28, 2021

(65) Prior Publication Data
US 2023/0033945 A1    Feb. 2, 2023

(51) Int. Cl.
| | |
|---|---|
| G06F 11/07 | (2006.01) |
| G06N 3/04 | (2023.01) |
| G06F 8/38 | (2018.01) |
| G06F 9/455 | (2018.01) |
| G06F 8/34 | (2018.01) |
| G06F 11/34 | (2006.01) |
| G06N 3/00 | (2023.01) |
| B25J 9/16 | (2006.01) |

(52) U.S. Cl.
CPC .......... B25J 9/1692 (2013.01); B25J 9/1656 (2013.01); B25J 9/1674 (2013.01)

(58) Field of Classification Search
CPC ...... B25J 9/1692; B25J 9/1656; B25J 9/1674; B25J 9/00; B25J 9/1628; B25J 9/163; B25J 9/161; G06F 11/0778; G06F 8/38; G06F 9/4552; G06F 8/34; G06F 11/3438; G06F 7/00; G06F 11/006; G06N 3/0442; G06N 3/045; G06N 3/008; G06N 20/00; G05B 13/0265; G05B 13/027; G05B 19/02; G05B 19/04; G05B 19/045; G05B 19/042; G05B 19/05; G05B 2219/00; G05B 2219/10; G05B 2219/20; G05B 2219/30; G05B 2219/1204; G05B 2219/23289; G05B 2219/25333
See application file for complete search history.

(56) References Cited

U.S. PATENT DOCUMENTS

| | | | |
|---|---|---|---|
| 2017/0295114 A1* | 10/2017 | Goldberg | H04L 67/306 |
| 2019/0332508 A1* | 10/2019 | Goyal | G06F 11/3414 |
| 2020/0306970 A1* | 10/2020 | Latkar | G06F 11/0766 |
| 2021/0044547 A1* | 2/2021 | Bradley | H04L 51/02 |
| 2022/0019195 A1* | 1/2022 | Yu | H04L 51/02 |
| 2022/0107624 A1* | 4/2022 | Amin | B25J 3/00 |
| 2022/0391227 A1* | 12/2022 | Grigore | G06F 9/45558 |
| 2022/0391820 A1* | 12/2022 | Boyd | G06N 20/00 |

* cited by examiner

*Primary Examiner* — Jonathan L Sample
*Assistant Examiner* — Byron Xavier Kasper
(74) *Attorney, Agent, or Firm* — SCHWEGMAN LUNDBERG & WOESSNER, P.A.

(57) ABSTRACT

In an example embodiment, a novel "process assembly line" solution is provided that organizes software robots in a manner that, once configured, allows them to be duplicated and cloned into multiple scenarios, including in organizational structures where one software robot is triggered or called by another software robot. Instead of designing software robots with multiple functionalities in each to perform complex situations, the process assembly line can utilize software robots with single functions. This aids developers in building robust software robots and reduces potential errors.

20 Claims, 10 Drawing Sheets

PROCESS ASSEMBLY LINE WITH ROBOTIC PROCESS AUTOMATION

BACKGROUND

Robotic Process Automation (RPA) allows for computer systems to perform automatic operations using artificial intelligence (AI) software. In traditional workflow automation tools, a software developer produces a list of actions to automate a task and interface to a back-end system using internal application programming interfaces (APIs) or dedicated scripting language. In contrast, RPA systems develop an action list by repetitively watching users perform tasks in a graphical user interface (GUI) and then automatically repeat those tasks in the GUI. This is performed by a software robot in the RPA.

BRIEF DESCRIPTION OF DRAWINGS

The present disclosure is illustrated by way of example and not limitation in the figures of the accompanying drawings, in which like references indicate similar elements.

DETAILED DESCRIPTION

The description that follows discusses illustrative systems, methods, techniques, instruction sequences, and computing machine program products. In the following description, for purposes of explanation, numerous specific details are set forth in order to provide an understanding of various example embodiments of the present subject matter. It will be evident, however, to those skilled in the art, that various example embodiments of the present subject matter may be practiced without these specific details.

A technical issue that arises with RPAs is that they only address individual processes in individual industries, and there is no mechanism for them to be applied to multiple processes across industries. For example, one bot may deal with finance while another deals with Information Technology (IT). Additionally, since software robots in an RPA are not able to call or trigger each other, often each software robot needs to be programmed with complex processes in order to handle all the functionality needed.

In an example embodiment, a novel "process assembly line" solution is provided that organizes software robots in a manner that, once configured, allows them to be duplicated and cloned into multiple scenarios, including in organizational structures where one software robot is triggered or called by another software robot.

Instead of designing software robots with multiple functionalities in each to perform complex situations, the process assembly line can utilize software robots with single functions. This aids developers in building robust software robots and reduces potential errors.

Once a single-task software robot is built, it can be quickly adopted into other scenarios by changing parameters and/or context information. Additionally, in some example embodiments, the concept of software robots triggering or calling other software robots is embedded into API calling using a central administrator to trigger successor software robots, thereby allowing easy integration between multiple software robots in performing the same automatic process together.

Further, in an example embodiment, some software robots are able to play the role of manager or information collector. When another software robot in the process assembly line is starting, running, or ending, it can communicate with a manager software robot to report its status, and this information can even inform predecessor and successor software robots of this information.

The result is that the process assembly line with RPA allows for a highly effective and organized way to manage RPA agents and robots. While the software robots deal with different tasks such as transferring data between different systems, logging Enterprise Resource Planning (ERP) to execute transaction code, etc., the process assembly line assembles these agents to handle more complicated scenarios.

Figure 1:
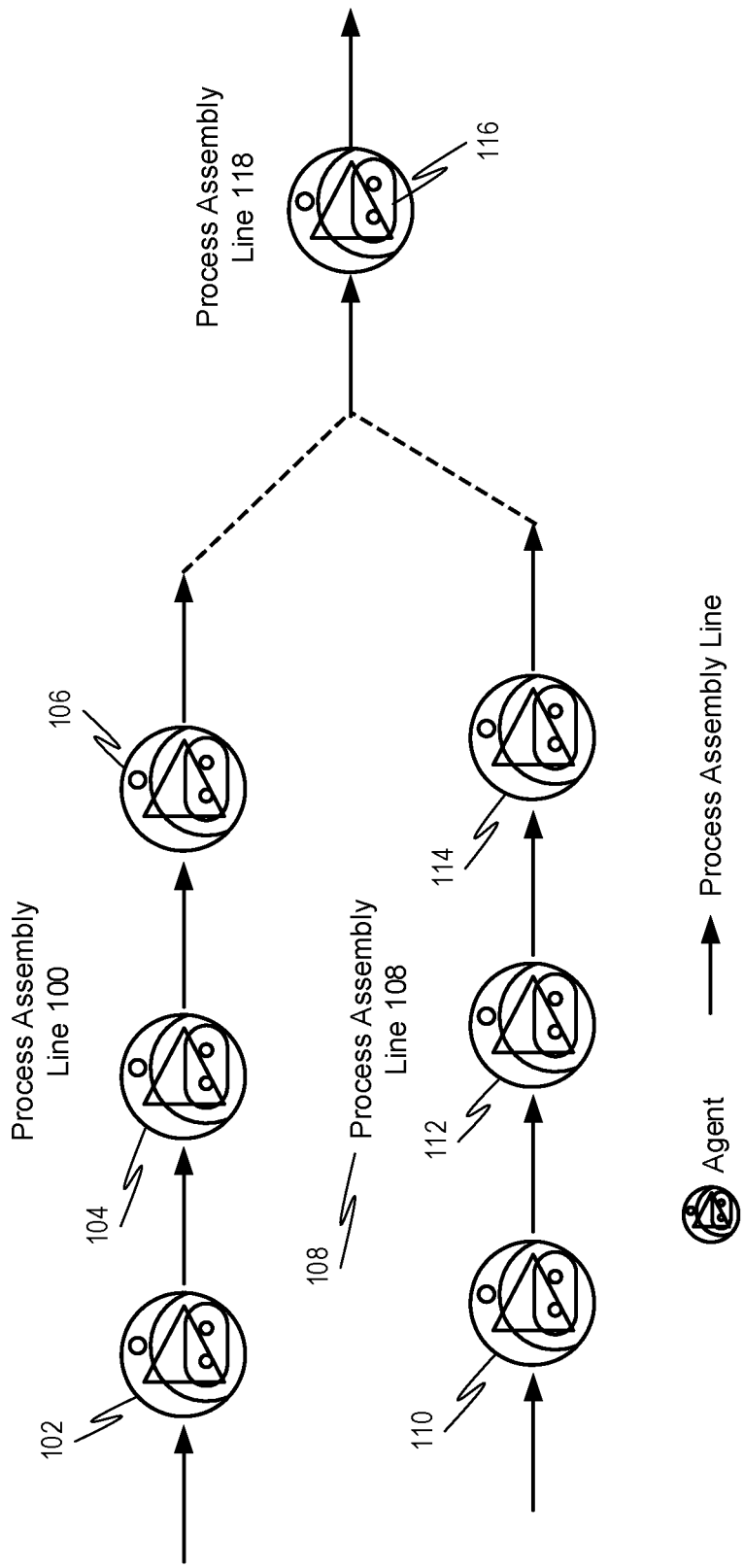
FIG. 1 is a diagram illustrating an example of merging process assembly lines, in accordance with an example embodiment.

Additionally, in an example embodiment, one process assembly line can be flexibly merged with another assembly line to become a more powerful assembly line. FIG. 1 is a diagram illustrating an example of merging process assembly lines, in accordance with an example embodiment. Here, process assembly line 100 contains software robots 102, 104, and 106. Process assembly line 108 contains software robots 110, 112, and 114. Output from software robot 106 can be sent along with output from software robot 114 to software robot 116 of process assembly line 118, thus making a larger assembly line having two parallel assembly lines. This reduces the deployment complexity and configuration management issues.

In an example embodiment, software robots in a process assembly line may comprise one of seven different types: (1) logic processing robot, (2) data validation and compliance robot, (3) notice and alert robot, (4) status and response robot, (5) inspection robot, (6) approver and monitoring robot, and (7) intelligent robot.

A logic processing robot is a common worker that is trained for tasks relevant to common processes. These tasks can be categorized based on their interaction aspects: one category is user interface (UI) controlling, and the other is API calling. In other words, when the logic processing robots are working, they can interface with different systems and applications using either a UI or API to complete some logic. The logic processing robots can be cloned and reused, as they can be programmed with very simple tasks that have relevance in many different industries (for example, running transaction codes to open GUI interfaces, reading grid view data from a database, performing educational background checks, and performing invoice checks).

Data validation and compliance robots focus on validation and compliance. The validation may be some basic data checking; for example, in some industries it may be forbidden to generate a negative number. This validation can be effective in multiple logics. Similarly, a compliance check can be performed in a variety of scenarios to ensure that data or processes meet certain compliance rules. Often the data validation and compliance robots can be used and reused frequently in the same process assembly line, such as by validating each entry of data by a user in a process.

Notice and alert robots are able to transmit messages, such as notices and alerts. For example, in some business processes, an end user needs to be notified of certain execution statuses or if something unexpected happens, such as errors and exceptions.

Status and response robots have two main tasks: to maintain the information from other software robots through collection and to be responsive to agents by providing information access via searching. For example, when a software robot finishes its job, it can send the status "done" to a status robot, which stores this information. When another software robot asks the status robot for the status of the finished software robot, the status robot can retrieve that status ("done") and send it to the requesting software robot.

Inspection robots play a role of "supervisor" in the process assembly line. The inspection robots have an overall monitoring or administrating goal. For example, the inspection robots can go and check if the latest data validation and compliance robots work fine, and if major failures happen, it can ask the alert robot to send alerts to a real human administrator. In another example, an inspection robot can check in the information in the status and response robot, to count all the number of failure jobs, and thus help monitor the overall robots' statuses. It can also generate a robot usage report to provide the full picture to a human administrator for a management decision.

Approver and monitoring robots are in a centralized position. In traditional RPA, it is difficult to let a software robot make a final decision. Process A needs to be approved by human approver A before process B begins. The approver and monitoring robot can offer an interface like a web page that informs the status of process A (e.g., 80% finished), so that approver A can fully understand and estimate when to take an action. Additionally, if process A has been completed, approver A can go to the web page directly to trigger process B.

Intelligent robots are designed with intelligent capabilities, mostly relevant to AI or machine learning technology. Optimal Character Recognition (OCR) may be one such technology. Other examples include decision tree for categorization, and deep learning (e.g., Recurrent Neural Network, Long Short-Term Memory) for prediction. These scenarios can generate intelligent solutions in supply chain or manufacturing areas.

In an example embodiment, an architecture for the process assembly line includes three layers of software robots: a logic layer, an acknowledgement layer, and a status layer. The logic layer covers most process logics, including logic processing robots, data validation and compliance robots, and intelligent robots. These three types of robots can support a lot of tasks, such as data checking, interacting with applications, and controlling UIs. In an example embodiment, there may be three triggering modes: attended mode, unattended mode, and API mode. In attended mode, the user triggers the robot, such as by providing input data. In unattended mode, the robot can be scheduled, such as on a periodic basis (e.g., triggers once an hour). In API mode, the user can send a post request to a centralized management service to trigger a robot. From end-to-end, there will be no interruptions or stops during the entire process assembly line. The robots in the assembly line finish all the tasks. However, in some example embodiments, the robots need approval from users.

The acknowledgement layer handles exceptions and notifications, particularly with notifications set to real users, such as business users, IT operation users, and managers. If an exception like a failure happens, an IT operations team nay be notified so that they can check whether the robots are healthy. Sending notifications can also help to improve visibility and productivity of process acceleration. When the process needs an approval from a key user the key user will be notified immediately after the preprocess has finished.

In the status layer, the statuses of all robots in the logic layer and acknowledgement layer are managed. For example, other robots may be alerted when a robot has completed a process. Additionally, after collecting all the information, the status robot can offer a searching service, where robots can request the status robot for status of other robots or historical statistics. This allows, for example, that if the entire process ended with an exception, each robot execution can be reviewed and the process restarted in the last successful execution to ensure integrity and consistency of data.

Figure 2:
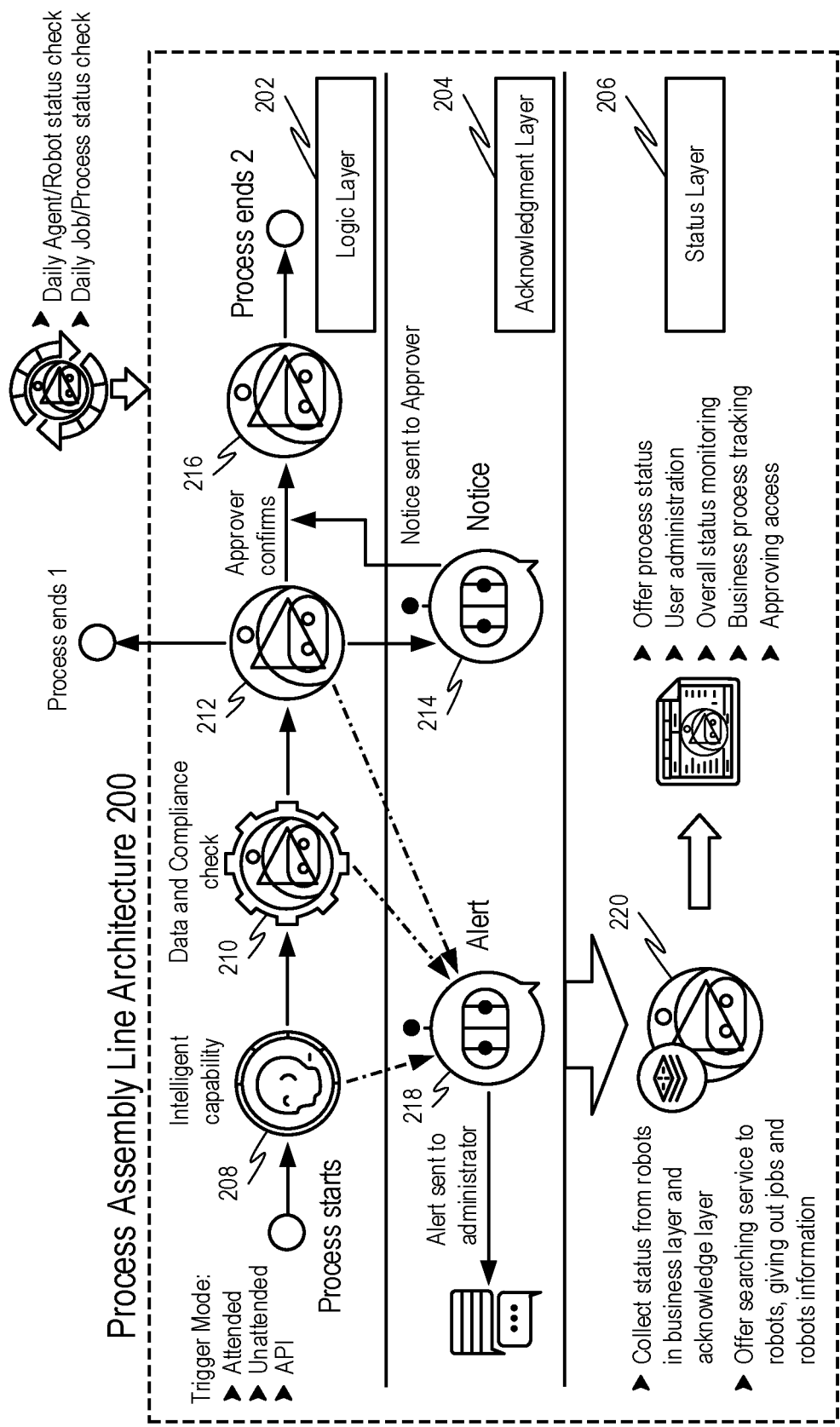
FIG. 2 is a block diagram illustrating a process assembly line architecture, in accordance with an example embodiment.

FIG. 2 is a block diagram illustrating a process assembly line architecture 200, in accordance with an example embodiment. The process assembly line architecture 200 includes a logic layer 202, acknowledgement layer 204, and status layer 206. Logic layer 202 includes an intelligent robot 208, which begins the process and performs some intelligent function, such as OCR. A data validation and compliance robot 210 then validates the output of the intelligent robot 208. This output is then sent to logic processing robot 212, which performs a task. In this example, the task involves some sort of notice that needs to be sent to an approver, which is handled by a notice robot 214 in the acknowledgement layer 204. Once approved, the output of logic processing robot 212 is sent to logic processing robot 216, which performs another task to complete the process.

An alert robot 218 monitors the running of the robots 208, 210, 212, 216 in the logic layer 202 and sends an alert to an administrator if there is an error or other issue that arises with the running. A status robot 220 then collects the statuses from the robots 208, 210, 212, 216 in the logic layer 202 and the robots 214, 218 in the acknowledgement layer 204 and offers a searching service to robots, giving out jobs and robot information. It may also provide a direct UI 222 that displays process status, permits user administration and overall status monitoring, and logic process tracking. It also provides the ability for a user to approve actions or outputs in the line.

In some example embodiments, an inspection robot is also included in the process assembly line architecture, although it lies outside any of the layers described above. When the robots are running in the assembly line, they are defined as workers, but it is also beneficial to have some robots with manager roles. These robots help to monitor and supervise robots in the logic layer, acknowledgement layer, and status layer, and perform tasks such as daily agent/robot status check, daily process/job status check, and robot return on investment checking and ranking.

In a further example embodiment, each robot plays an independent role in different tasks and communicates with a customer's system independently, whether that system is an ERP, website, or mainframe terminal.

Figure 3:
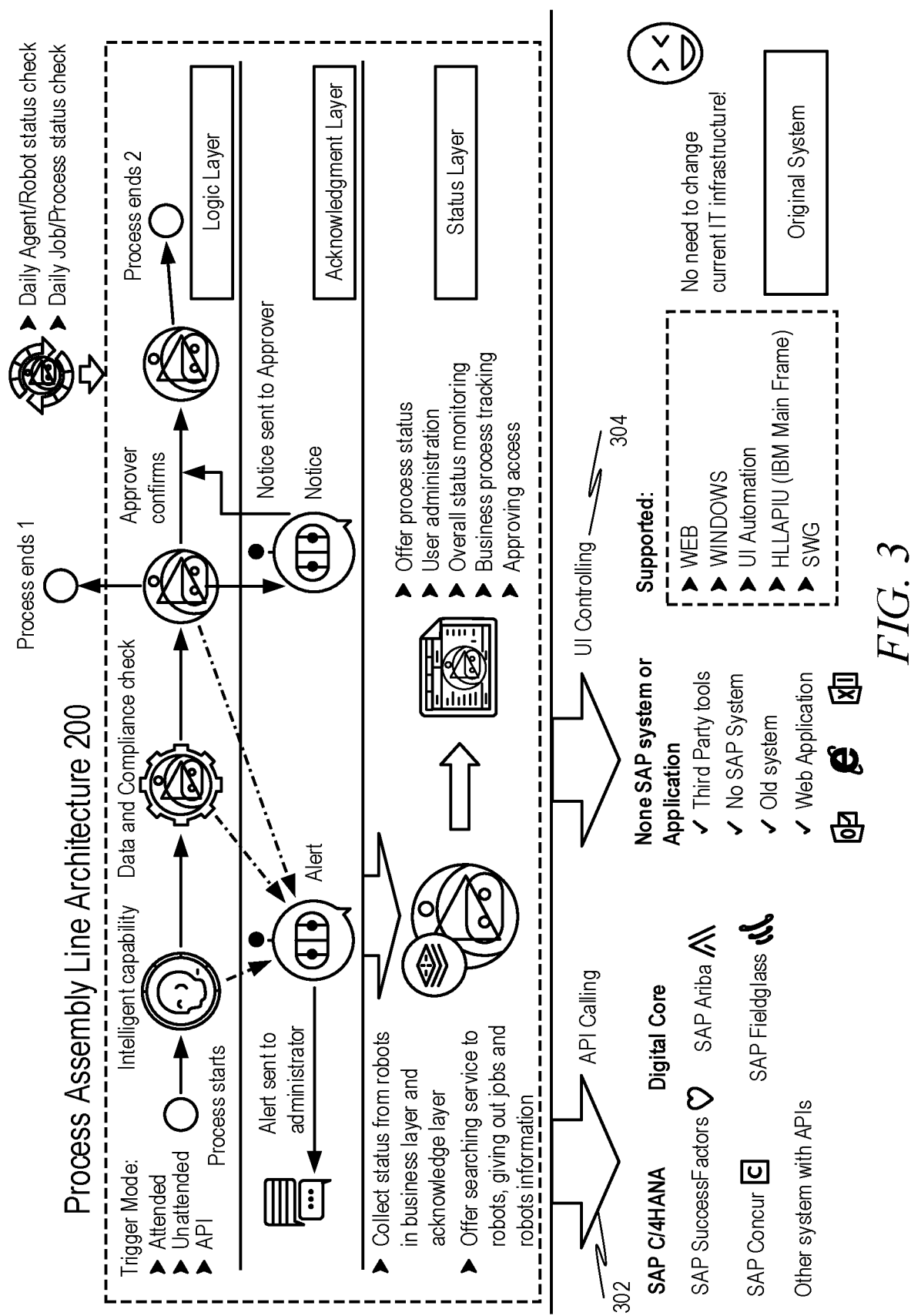
FIG. 3 is a block diagram illustrating a process assembly line architecture, in accordance with another example embodiment.

FIG. 3 is a block diagram illustrating a process assembly line architecture, in accordance with another example embodiment. Here, the robots in the process assembly line architecture 200 work with a customer system using two main approaches: API calling 302 and UI controlling 304. Certain applications, such as in-memory databases (like HANA™ from SAP SE of Frankfurt, Germany), HR management software (like SAP SuccessFactors™ from SAP SE of Frankfurt, Germany), and procurement and supply chain software (like SAP Ariba™ from SAP SE of Frankfurt, Germany) offer direct API access for calling robots and are thus connected to the API calling 302 portion. Other applications, such as Enterprise Resource Planning GUIs read dynamic tables and thus are connected to the UI controlling 304 portion. These portions 302, 304 allow for integration of the process assembly line with existing applications without the need to modify the existing applications.

The robots described may be automatically generated based on user interaction data.

An application server provides an application or set of applications to one or more client devices. One or more users of the client devices interact with the applications to perform a business process. For example, in an accounts receivable process, a first user uses a first UI to enter data for a customer who can pay invoices; a second user uses a second UI to generate an invoice to be paid by the customer; and a third user uses a third UI to enter data for a received payment.

A business process comprises one or more operations that create, modify, or delete a business object. A business object is an object (in the Object-Oriented Programming sense of the word) or data structure that represents a business entity. A business entity is any person, place, thing, document, or service that relates to a business. Example business entities include employees, customers, companies, sales orders, invoices, products, and services. A business object has a lifecycle in which the business object is created, used, and destroyed. For example, a business object for an employee is created when the employee is hired, maintained and modified during the employee's term of employment, and may be deleted or archived when the relationship with the employee is severed. A business process may correlate to a part of (or the entirety of) the lifecycle of a business object. By way of example, the methods and systems described herein operate on business processes and business objects, but the scope of the present disclosure is not so limited.

One or more of the client devices store data that tracks user interactions with the application. In some example embodiments, the time, location, and UI element of each mouseclick and keypress are stored. The data is transmitted from the client devices to the application server for analysis. Data from multiple client devices is correlated to enable analysis of a complex business process. As a result of the analysis, bottlenecks may be identified based on a particular UI taking a long time to complete or receiving repeated re-entry of data. The solution is automated and scalable, allowing for analysis of an entire business process landscape.

Each time a user opens an application, the application identifies a type of business object being worked on to identify the business process. For example, if the user is working on a specific invoice with identifier 12314, the UI of the application will include the string "Invoice 12314" somewhere. Thus, each UI can be analyzed to determine if the word "Invoice" followed by a number is present and the business object identified accordingly. As another example, if the user is working on a specific customer with identifier 54321, the UI of the application will include the string "Customer 54321" somewhere. Thus, the frontend process mining system can determine both if the business object being worked on is a Customer or an Invoice as well as the specific business object being worked on. The business process is identified based on the name of the application and the changes performed by the user. The completion of the process step is determined based on specific UI elements interacted with by the user (e.g., a "submit" or "save" button).

In response to completion of a process step or at a predetermined time (e.g., once per hour), the client device sends the frontend process mining data to the bot generation server for analysis. Based on an analysis of the frontend process mining data, the bot generation server generates a bot to automate a process step. For example, the bot generation server may provide a heatmap UI that allows an administrator to determine which process step is experiencing a high rate of data re-entry (e.g., a rate that exceeds a predetermined threshold).

Using the heatmap UI, the administrator selects the process step for automation. In response to the selection, the bot generation server identifies, based on the observed behavior gathered through frontend process mining, relationships between input fields, typical values for input fields, typical order of entry of data into input fields, or any suitable combination thereof. Based on the identified patterns, the bot generation server generates a bot to automate some or all of the process step.

Figure 4:
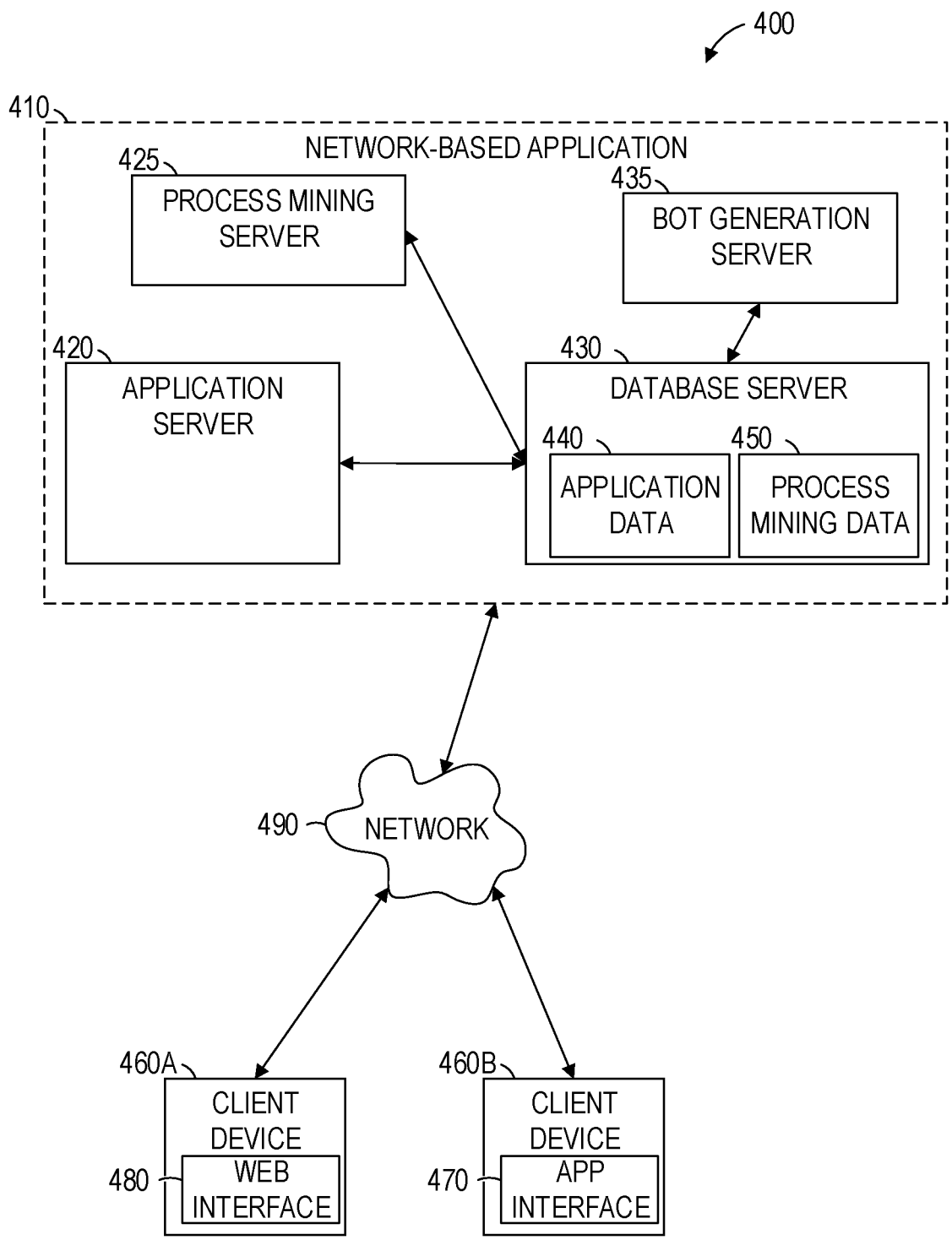
FIG. 4 is a network diagram illustrating a network environment suitable for generating bots based on observed behavior, according to some example embodiments.

FIG. 4 is a network diagram illustrating a network environment 400 suitable for generating bots based on observed behavior, according to some example embodiments. The network environment 400 includes a network-based application 410, client devices 460A and 460B, and a network 490. The network-based application 410 is provided by an application server 420 in communication with a database server 430, storing application data 440 and process mining data 450. The processes provided by the application server 420 are monitored by a process mining server 425, also in communication with a database server 430. The application server 420 accesses the application data 440 to provide an application to the client devices 460A and 460B via a web interface 480 or an application interface 470. A bot generation server 435, which may be considered a part of the network-based application 410 or a separate system, accesses the process mining data 450 to generate bots based on observed behavior. The client devices 460A and 460B may be referred to collectively as client devices 460 or generically as a client device 460.

The process mining server 425 receives data from the client devices 460 regarding user interactions with the application. The received data is provided to the database server 430 for storage as the process mining data 450. The process mining data 450 is analyzed by the process mining server 425 to identify problems in a business process being performed using the application. In response to identifying a problem in a business process, the bot generation server 435 generates a bot to automate a portion of the business process.

Any of the machines, databases, or devices shown in FIG. 4 may be implemented in a general-purpose computer modified (e.g., configured or programmed) by software to be a special-purpose computer to perform the functions described herein for that machine, database, or device. As used herein, a "database" is a data storage resource and may store data structured as a text file, a table, a spreadsheet, a relational database (e.g., an object-relational database), a triple store, a hierarchical data store, a document-oriented NoSQL database, a file store, or any suitable combination thereof. The database may be an in-memory database. Moreover, any two or more of the machines, databases, or devices illustrated in FIG. 4 may be combined into a single machine, database, or device, and the functions described herein for any single machine, database, or device may be subdivided among multiple machines, databases, or devices.

The application server 420, the process mining server 425, the database server 430, the bot generation server 435, and the client devices 460A-460B are connected by the network 490. The network 490 may be any network that enables communication between or among machines, databases, and devices. Accordingly, the network 490 may be a wired network, a wireless network (e.g., a mobile or cellular network), or any suitable combination thereof. The network 490 may include one or more portions that constitute a private network, a public network (e.g., the Internet), or any suitable combination thereof.

Figure 5:
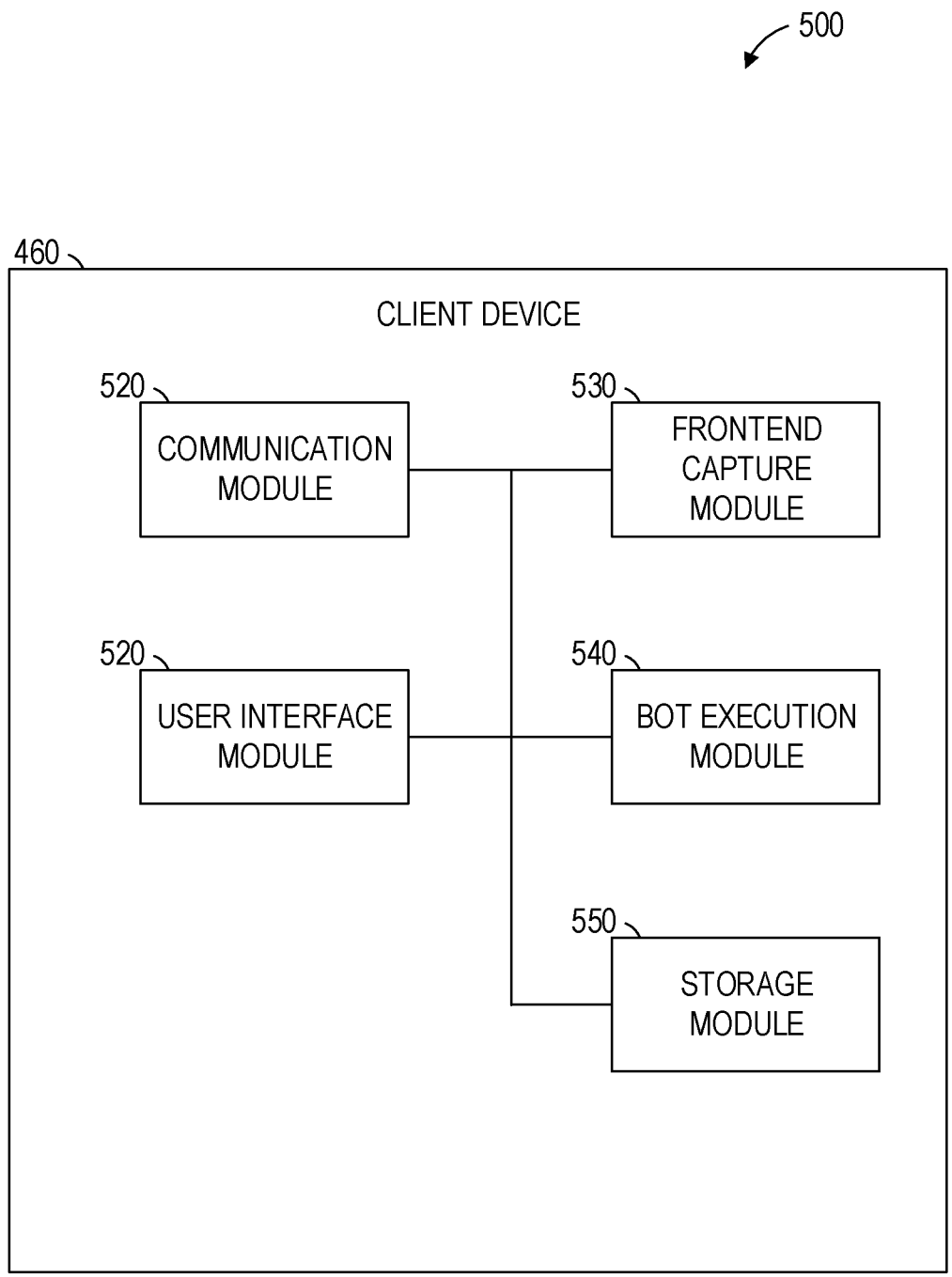
FIG. 5 is a block diagram of a client device, according to some example embodiments, suitable for observing behavior and running bots.

FIG. 5 is a block diagram 500 of a client device, according to some example embodiments, suitable for observing behavior and running bots. The client device 460 is shown as including a communication module 520, a UI module 520, a frontend capture module 530, a bot execution module 540, and a storage module 550, all configured to communicate with each other (e.g., via a bus, shared memory, or a switch). Any one or more of the modules described herein may be implemented using hardware (e.g., a processor of a machine). For example, any module described herein may be implemented by a processor configured to perform the operations described herein for that module. Moreover, any two or more of these modules may be combined into a single module, and the functions described herein for a single module may be subdivided among multiple modules. Furthermore, according to various example embodiments, modules described herein as being implemented within a single machine, database, or device may be distributed across multiple machines, databases, or devices.

The communication module 520 receives data sent to the client device 460 and transmits data from the client device 460. For example, the communication module 520 receives, from the application server 420, data (e.g., a hypertext markup language (HTML) file) for a selected application. As another example, the communication module 520 receives, from the bot generation server 435, a bot for automation of a portion of a business process. The communication module 51=20 provides the data to the UI module 520. The UI module 520 causes a UI for the application to be displayed on a display device integrated into or connected to the client device 460. The UI module 520 may receive from the application server 420 instructions (e.g., an executable or interpreted file or data) that, when executed by the client device 460, cause the client device 460 to perform operations. The operations include displaying a UI for performing a task of a business process, storing a timestamp for each user interaction with the UI, and transmitting the user interaction data to the application server 420.

The frontend capture module 530 gathers data regarding user interactions with the UI and stores the gathered data on a storage device of the client device 460 via the storage module 550. In response to a request from the application server 420, the frontend capture module 530 retrieves the stored data and transmits the stored data to the application server 420 via the communication module 520. In alternative embodiments, the process mining data is sent to the application server periodically (e.g., once per minute or once per hour) or in response to a particular interaction with the UI (e.g., detecting that a button was pressed that indicates that data entry is complete).

In some example embodiments, the frontend capture module 530 is implemented as a JavaScript client that periodically transmits JavaScript object notation (JSON)-formatted data to the application server 420. In other example embodiments, the frontend capture module 530 is implemented as a browser (e.g., Chrome or Firefox) plugin or extension. In still other example embodiments, the frontend capture module 530 captures data from Fiori applications running on S/4HANA®. User-identifying data may be stripped from the process mining data by the frontend capture module 530 before the data is transmitted to the application server 420.

The process mining data comprises metadata, clickstreams, or both. Metadata includes information that identifies the process, the process instance, and the observed user activities (e.g., which UI buttons were pressed, which checkboxes were selected, what the final text in a text field was). Clickstreams include information about mouse movements and key presses and their sequence and timings that generated the observed user activities.

Privacy may be protected using domain whitelisting. A list of domains is accessed by the frontend capture module 530 and process mining data is gathered only when the web browser is presenting a web page from a whitelisted domain. If the user switches to an unlisted domain, the data collection pauses.

Additionally or alternatively, privacy may be protected by obfuscating or removing user-identifying information by the client-side process before transmitting the information to the process mining server 425. Content entered into data fields may be hashed by the frontend capture module 530 prior to transmission. The hashing of the data fields protects the user- or company-identifying or confidential information but still allows the bot generation server 435 to determine when the same value is being entered across multiple process instances because the hashes will be the same. This enables the determination of which tasks have high repeatability, even if the automated bot generation process cannot identify the common value. Furthermore, even when the data values are obfuscated, aggregated information such as the total number of clicks, total number of characters entered, number of paste actions, number of character deletions, how often the focus was switched away, location in the Document Object Model (DOM) hierarchy of each click and character entry, and total time spent are reported. This enables the determination of which tasks are unusually time-consuming and thus are good choices for automation.

The bot execution module 540 executes bots received from the bot generation server 435. A UI bot interacts with a UI provided by the application server 420 by simulating the actions of a user. In various example embodiments, the UI bot controls the mouse cursor, selects input fields, enters text data, selects values from drop down lists, submits forms, or any suitable combination thereof. The bot may be executed using JavaScript run by a browser plug-in, as a program in a separate running environment, or any suitable combination thereof.

Figure 6:
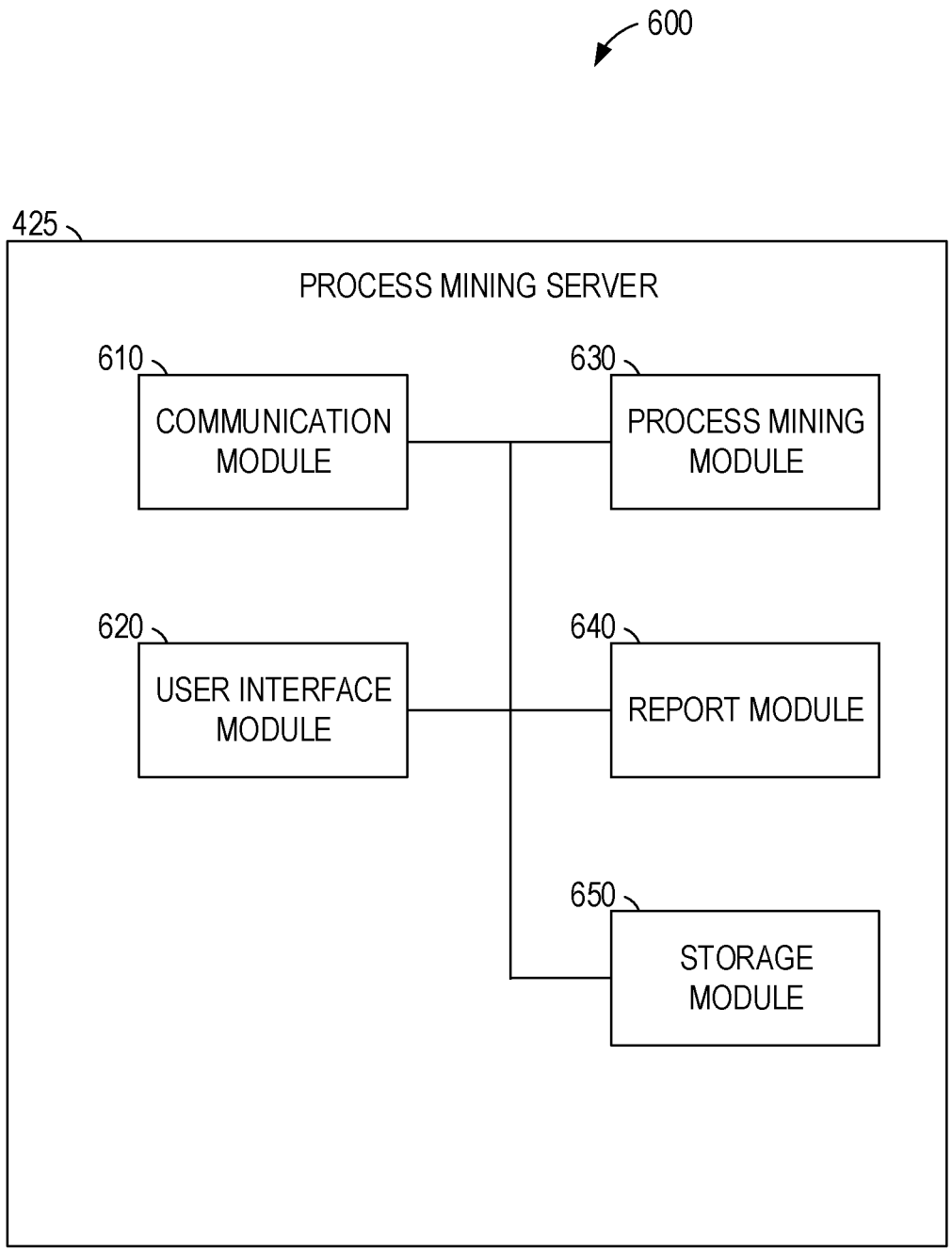
FIG. 6 is a block diagram of the process mining server, according to some example embodiments, suitable for frontend process mining.

FIG. 6 is a block diagram 600 of the process mining server 425, according to some example embodiments, suitable for frontend process mining. The process mining server 425 is shown as including a communication module 610, a UI module 620, a process mining module 630, a report module 640, and a storage module 650, all configured to communicate with each other (e.g., via a bus, shared memory, or a switch). Any one or more of the modules described herein may be implemented using hardware (e.g., a processor of a machine). For example, any module described herein may be implemented by a processor configured to perform the operations described herein for that module. Moreover, any two or more of these modules may be combined into a single module, and the functions described herein for a single module may be subdivided among multiple modules. Furthermore, according to various example embodiments, modules described herein as being implemented within a single machine, database, or device may be distributed across multiple machines, databases, or devices.

The communication module 610 receives data sent to the process mining server 425 and transmits data from the process mining server 425. For example, the communication module 610 may receive, from the client device 460, frontend process mining data. The communication module 610 provides the frontend process mining data to the process mining module 630, stores submitted data in the database of the database server 430 via the storage module 650, or any suitable combination thereof.

The process mining module 630 receives frontend process mining data from the client device 460 (e.g., the process mining module 630 may request the frontend process mining data, the client device 460 may push the frontend process mining data, or both). In some example embodiments, the frontend process mining data is received via the communication module 610 and stored in a database via the storage module 650. After being stored, the data may be accessed from the database. Communications sent and received by the communication module 520 may be intermediated by the network 490.

The UI module 620 causes presentation of a UI for the process mining server 425 on a display (e.g., a display associated with an administrator of the process or a display of a device of another user interested in understanding and optimizing processes). The UI allows a user to select a process or a process instance from a list of processes or process instances, to view process mining data for the selected process or process instances, to modify a process, to select a process or task of the process for generating a bot based on observed behavior, or any suitable combination thereof. The UI may be presented using Process Innovation Explorer (PIE).

The report module 640 generates a report based on process mining data analyzed by the process mining module 630. For example, multiple users on different client devices 460 each interact with different UIs while working on a single business process (e.g., an accounts receivable process). Data gathered during each interaction is stored by the process mining module 630 as the process mining data 450 of the database server 430. The gathered data is analyzed by the process mining module 630 and a UI is identified that has a substantially higher than average number of interactions with a particular data entry field. As an example, identification of such a UI is performed by comparing weekly averages of how long each process step takes and determining that an anomaly is present when a process step varies from the average by 20% or more. In response to the detection of this anomaly, the process mining module 630 causes the report module 640 to generate a report (e.g., in an email or text message) and to send the report to an administrative account, causes the bot generation server to generate a bot to automate the process step, or any suitable combination thereof.

Figure 7:
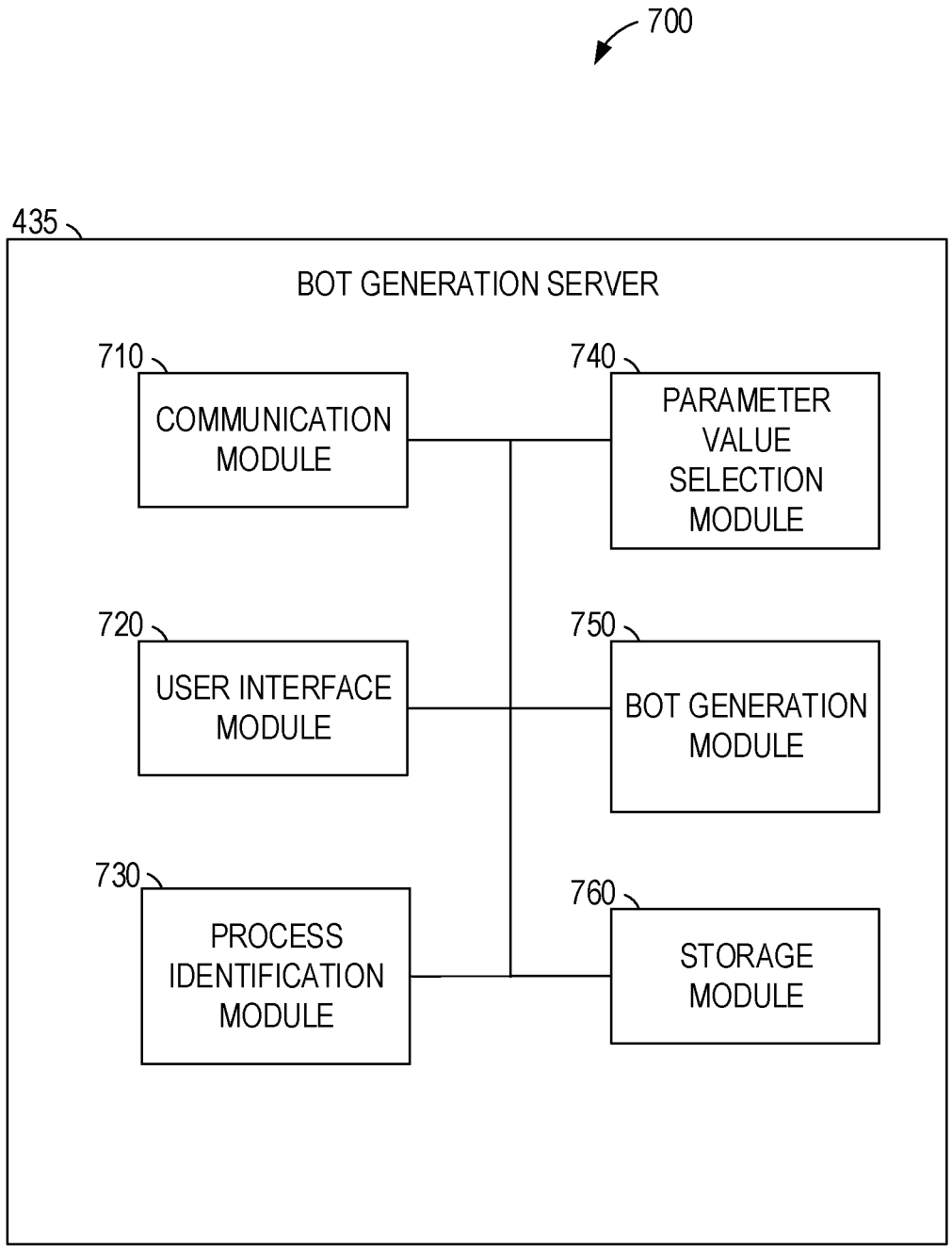
FIG. 7 is a block diagram of the bot generation server, according to some example embodiments, suitable for generating bots based on observed behavior.

FIG. 7 is a block diagram 700 of the bot generation server 435, according to some example embodiments, suitable for generating bots based on observed behavior. The bot generation server 435 is shown as including a communication module 710, a UI module 720, a process identification module 730, a parameter value selection module 740, a bot generation module 750, and a storage module 760, all configured to communicate with each other (e.g., via a bus, shared memory, or a switch). Any one or more of the modules described herein may be implemented using hardware (e.g., a processor of a machine). For example, any module described herein may be implemented by a processor configured to perform the operations described herein for that module. Moreover, any two or more of these modules may be combined into a single module, and the functions described herein for a single module may be subdivided among multiple modules. Furthermore, according to various example embodiments, modules described herein as being implemented within a single machine, database, or device may be distributed across multiple machines, databases, or devices.

The communication module 710 receives data sent to the bot generation server 435 and transmits data from the bot generation server 435. For example, the communication module 710 may receive, from the database server 430, frontend process mining data. The communication module 710 provides the frontend process mining data to the process identification module 730 and the parameter value selection module 740. Communications sent and received by the communication module 710 may be intermediated by the network 490.

The process identification module 730 receives frontend process mining data from the database server 430. Based on the frontend process mining data, the process identification module 730 identifies a process or process step that would benefit from automation. The determination may be based on statistics for the process or process step and a predetermined threshold. For example, a process step with an unusually high variance in time to completion may benefit from automation and this may be detected by comparing the variance in time to completion to a predetermined threshold variance.

The UI module 720 causes presentation of a UI for the bot generation server 435 on a display associated with an administrator of the process. The UI allows a user to select a process or a process instance from a list of processes or process instances, to view process mining data for the selected process or process instance, to select a process or task of the process for generating a bot based on observed behavior, to modify or approve a generated bot, or any suitable combination thereof.

The bot generation module 750 generates bots that perform sequences of behaviors in a task, based on clickstreams. The parameter value selection module 740 determines default parameter values for a generated bot based on process mining data. For example, multiple users on different client devices 460 each interact with different UIs while working on a single business process (e.g., an accounts receivable process). The gathered data is analyzed by the process identification module 730 and a UI is identified that has a substantially higher than average number of interactions with a particular data entry field. As an example, identification of such a UI is performed by comparing weekly averages of how long each process step takes and determining that an anomaly is present when a process step varies from the average by 20% or more. The bot generation module 750 is invoked by a user or automatically. For example, in an automatic implementation, in response to the detection of this anomaly, the process identification module 730 generates a bot that uses a set of parameters to determine the selections or data entries to make in the UI.

The parameter value selection module 740 determines, based on the clickstream data, default values for the parameters. For example, if one data entry field receives the same value more than a threshold percentage of the time (e.g., 50%), as observed in the clickstream data, that value is used as the default value for the parameter that controls data entry into that data entry field. As another example, if two data entry fields have the same value more than a threshold percentage of the time (e.g., 50%), a Boolean parameter for the bot that causes the data entry to be the same in both fields if true and allows different values if false defaults to true.

The bot generation server 435 stores generated bots using the storage module 760. The stored bots may be stored on a data storage device (e.g., hard drive) of the bot generation server 435, on a data storage device of the database server 430, or on another data storage device. In some example embodiments, the bots are generated in a format compatible with SAP Intelligent Robotic Process Automation Studio. In other example embodiments, the bot generation server 435 provides parameters to control bot creation to SAP Intelligent Robotic Process Automation Studio and SAP Intelligent Robotic Process Automation generates the bot.

In an example embodiment, the stored bots in the storage module 760 are organized as a process assembly line as described above. The result is that technical problems can be overcome. The first such problem is that software robots in the RPAs can become overloaded. A single robot agent running in a system can occasionally become overloaded based on usage. There is currently no mechanism to distribute the load across multiple robots in an efficient manner.

The second problem is that software robots in RPAs cannot be called or triggered by other robots, which limits the organization of RPAs such that even if multiple software robots are contained in a single RPA application interface framework (AIFs), their architecture is quite complex and requires significant effort to configure and customize new interfaces. The complexity is based on the large number of different layers and on typically proprietary ways application logic is implemented. The present solution solves both these issues.

Figure 8:
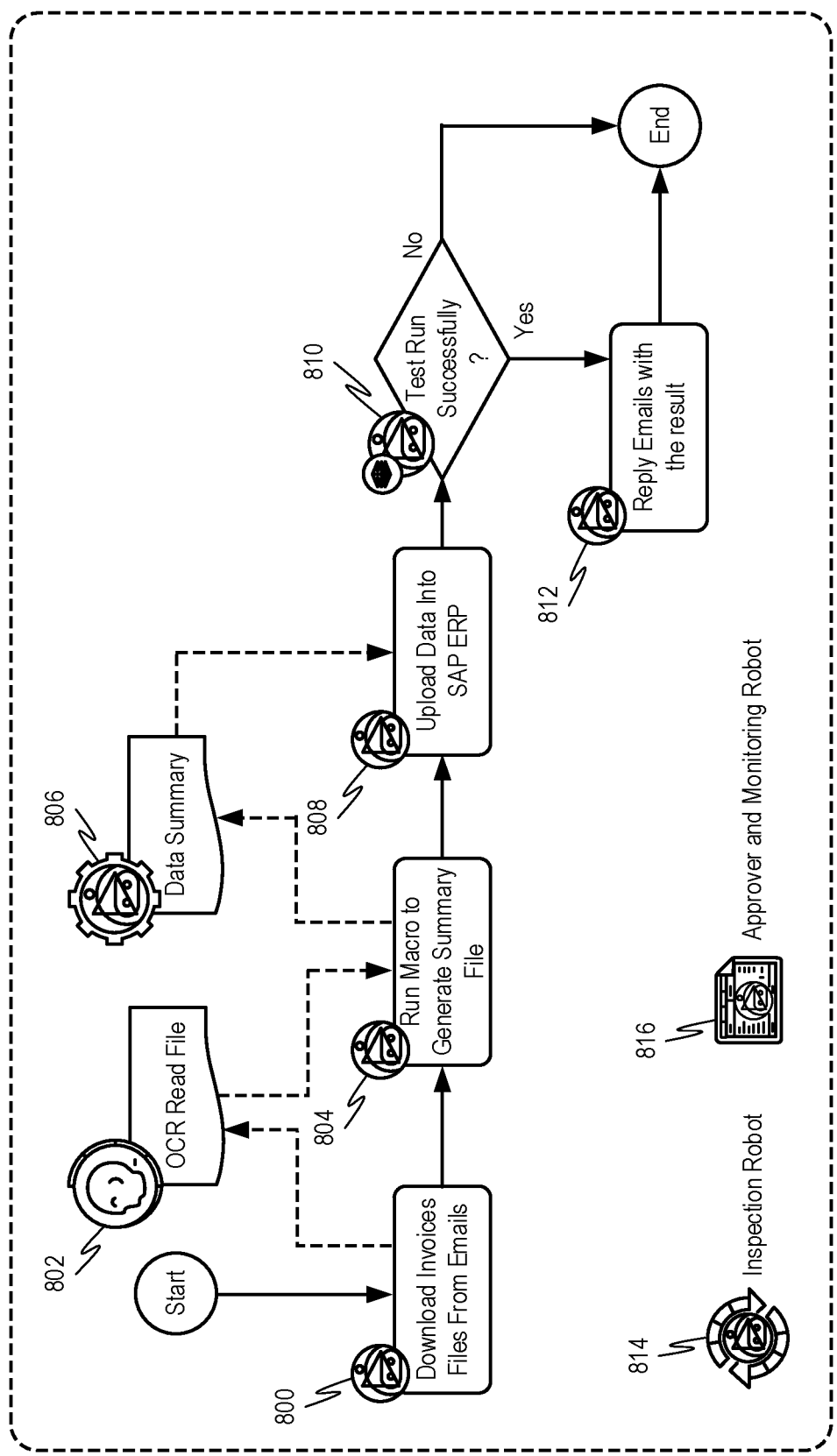
FIG. 8 is a block diagram illustrating an example of the operation of a process assembly line in a specific situation, in accordance with an example embodiment.

FIG. 8 is a block diagram illustrating an example of the operation of a process assembly line in a specific situation, in accordance with an example embodiment. Here, the example involves an invoice in a financial industry. A first logic processing robot 800 downloads invoice files from emails. This includes making calls to and receiving data from an email server. An intelligent robot 802 then performs OCR to obtained structured data from the invoice files, such as amounts. This includes making calls to, and receiving results from, an OCR service having a trained machine learned model. A second logic processing robot 804 then runs a macro, such as in a spreadsheet application, to generate data summaries, such as an amount of tax. A data validation or compliance robot 806 then ensures the data in the data summaries are valid and in compliance, such as by comparing them with particular thresholds and/or rules. Assuming it is in compliance and valid, a third logic processing robot 808 then uploads the data into an ERP system. This may include calling to and receiving results from a GUI scripting module, which contains functionality to interact with an ERP system through GUIs such as logging in, logging output, inputting data, and processing. A status and response robot 810 then determines if a test run performed on the data in the ERP system has performed successfully. If so, then a notice and alert robot 812 sends replies to the emails with the results, through interaction with the email server. During this whole process, an inspection robot 814 can monitor all the robots, and the end user can look at the process status through an approver and monitoring robot 816.

In view of the above-described implementations of subject matter this application discloses the following list of examples, wherein one feature of an example in isolation or more than one feature of said example taken in combination and, optionally, in combination with one or more features of one or more further examples are further examples also falling within the disclosure of this application:

Example 1

A system comprising:
at least one hardware processor; and
a non-transitory computer-readable medium storing instructions that, when executed by the at least one hardware processor, cause the at least one hardware processor to perform operations comprising:
executing a first logic processing software robot contained in a logic layer of a process assembly line, the execution of the first logic processing software robot causing a first set one or more processes learned via first previous user interaction data to be executed;
causing the first logic processing software robot to trigger execution of a second logic processing software robot contained in the logic layer of the process assembly line, the execution of the second logic processing software robot causing a second set of one or more processes learned via second previous user interaction data to be executed;
upon an error occurring during the execution of the first logic processing software robot or the second logic processing software robot, causing an alert to be generated to an alert software robot contained in an acknowledgement layer of the process assembly line;
upon the alert software robot receiving the alert, causing the alert software robot to send the alert to a user; and
collecting, at a status and response software robot contained in a status layer of the process assembly line, data from the first logic processing software robot, the second logic processing software robot, and the alert software robot and providing a search service allowing software robots to query the data.

Example 2

The system of Example 1, wherein the operations further comprise:
executing a first intelligent software robot contained in the logic layer of the process assembly line, the execution of the first intelligent software robot causing running of a machine learned model; and causing the first intelligent software robot to trigger execution of the first logic processing software robot.

Example 3

The system of Examples 1 or 2, wherein the operations further comprise:
causing the second logic processing software robot to trigger execution of a data validation and compliance software robot contained in the logic processing layer of the process assembly line, the execution of the validation and compliance software robot causing one or more data validation operations to be performed.

Example 4

The system of any of Examples 1-3, wherein at least one of the software robots supports Application Program Interface (API) calling to an external application.

Example 5

The system of any of Examples 1-4, wherein at least one of the software robots supports user interface controlling.

Example 6

The system of Example 4, wherein the external application is an in-memory database.

Example 7

The system of Example 4, wherein the external application is procurement and supply chain software.

Example 8

A method comprising:
executing a first logic processing software robot contained in a logic layer of a process assembly line, the execution of the first logic processing software robot causing a first set one or more processes learned via first previous user interaction data to be executed;
causing the first logic processing software robot to trigger execution of a second logic processing software robot contained in the logic layer of the process assembly line, the execution of the second logic processing software robot causing a second set of one or more processes learned via second previous user interaction data to be executed;
upon an error occurring during the execution of the first logic processing software robot or the second logic processing software robot, causing an alert to be generated to an alert software robot contained in an acknowledgement layer of the process assembly line;
upon the alert software robot receiving the alert, causing the alert software robot to send the alert to a user; and
collecting, at a status and response software robot contained in a status layer of the process assembly line, data from the first logic processing software robot, the second logic processing software robot, and the alert software robot and providing a search service allowing software robots to query the data.

Example 9

The method of Example 8, further comprising:
executing a first intelligent software robot contained in the logic layer of the process assembly line, the execution of the first intelligent software robot causing running of a machine learned model; and
causing the first intelligent software robot to trigger execution of the first logic processing software robot.

Example 10

The method of Examples 8 or 9, further comprising:
causing the second logic processing software robot to trigger execution of a data validation and compliance software robot contained in the logic processing layer of the process assembly line, the execution of the validation and compliance software robot causing one or more data validation operations to be performed.

Example 11

The method of any of Examples 8-10, wherein at least one of the software robots supports Application Program Interface (API) calling to an external application.

Example 12

The method of any of Examples 8-11, wherein at least one of the software robots supports user interface controlling.

Example 13

The method of Example 11, wherein the external application is an in-memory database.

Example 14

The method of Example 11, wherein the external application is procurement and supply chain software.

Example 15

A non-transitory machine-readable medium storing instructions which, when executed by one or more processors, cause the one or more processors to perform operations comprising:
executing a first logic processing software robot contained in a logic layer of a process assembly line, the execution of the first logic processing software robot causing a first set one or more processes learned via first previous user interaction data to be executed;
causing the first logic processing software robot to trigger execution of a second logic processing software robot contained in the logic layer of the process assembly line, the execution of the second logic processing software robot causing a second set of one or more processes learned via second previous user interaction data to be executed;
upon an error occurring during the execution of the first logic processing software robot or the second logic processing software robot, causing an alert to be generated to an alert software robot contained in an acknowledgement layer of the process assembly line;
upon the alert software robot receiving the alert, causing the alert software robot to send the alert to a user; and collecting, at a status and response software robot contained in a status layer of the process assembly line, data from the first logic processing software robot, the second logic processing software robot, and the alert software robot and providing a search service allowing software robots to query the data.

Example 16

The non-transitory machine-readable medium of Example 15, wherein the operations further comprise:
executing a first intelligent software robot contained in the logic layer of the process assembly line, the execution of the first intelligent software robot causing running of a machine learned model; and
causing the first intelligent software robot to trigger execution of the first logic processing software robot.

Example 17

The non-transitory machine-readable medium of Examples 15 or 16, wherein the operations further comprise:
causing the second logic processing software robot to trigger execution of a data validation and compliance software robot contained in the logic processing layer of the process assembly line, the execution of the validation and compliance software robot causing one or more data validation operations to be performed.

Example 18

The non-transitory machine-readable medium of any of Examples 15-17, wherein at least one of the software robots supports Application Program Interface (API) calling to an external application.

Example 19

The non-transitory machine-readable medium of any of Examples 15-18, wherein at least one of the software robots supports user interface controlling.

Example 20

The non-transitory machine-readable medium of Example 18, wherein the external application is an in-memory database.

Figure 9:
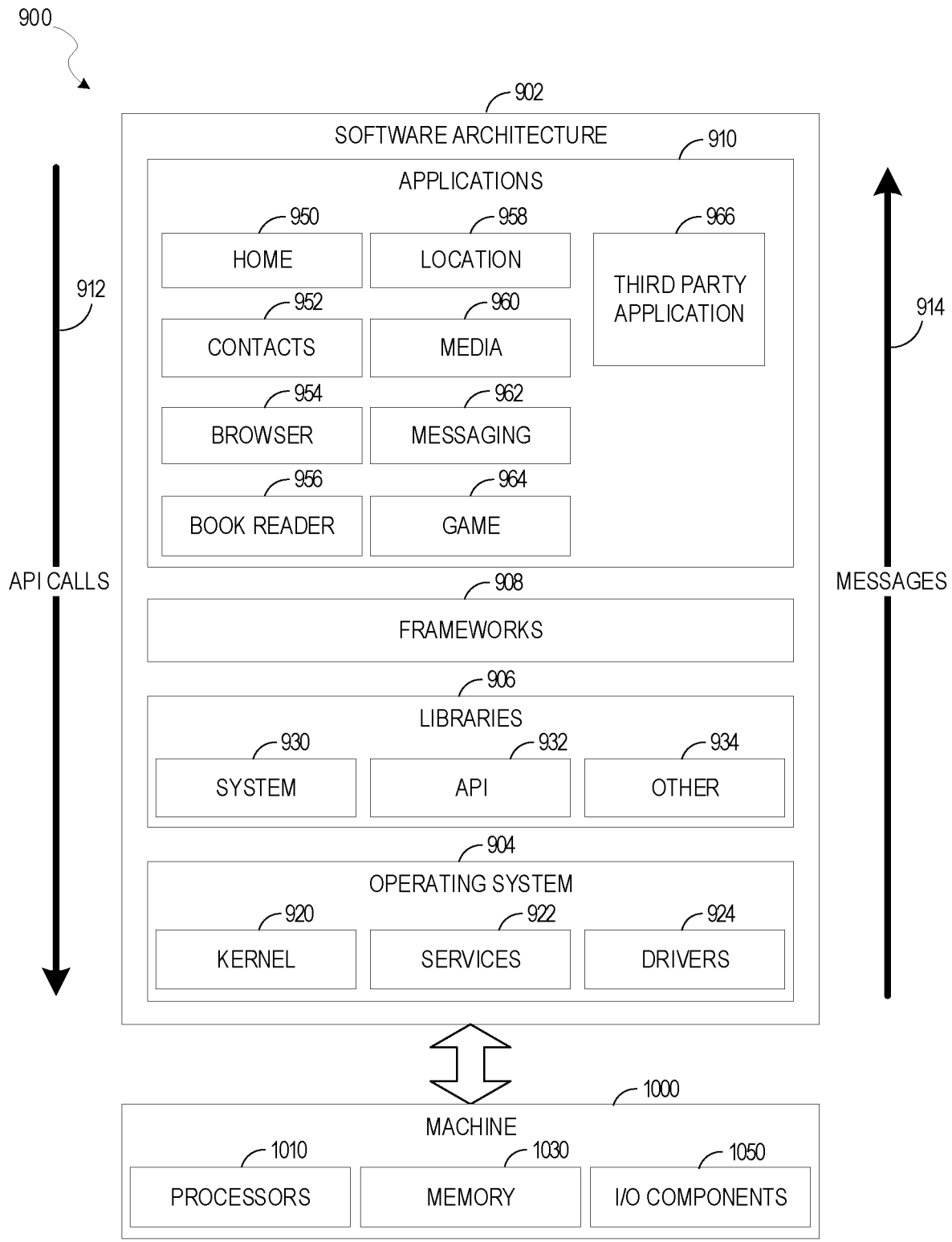
FIG. 9 is a block diagram illustrating an example architecture of software, which can be installed on any one or more of the devices described above.

FIG. 9 is a block diagram 900 illustrating a software architecture 902, which can be installed on any one or more of the devices described above. FIG. 9 is merely a non-limiting example of a software architecture, and it will be appreciated that many other architectures can be implemented to facilitate the functionality described herein. In various embodiments, the software architecture 902 is implemented by hardware such as a machine 1000 of FIG. 10 that includes processors 1010, memory 1030, and input/output (I/O) components 1050. In this example architecture, the software architecture 902 can be conceptualized as a stack of layers where each layer may provide a particular functionality. For example, the software architecture 902 includes layers such as an operating system 904, libraries 906, frameworks 908, and applications 910. Operationally, the applications 910 invoke API calls 912 through the software stack and receive messages 914 in response to the API calls 912, consistent with some embodiments.

In various implementations, the operating system 904 manages hardware resources and provides common services. The operating system 904 includes, for example, a kernel 920, services 922, and drivers 924. The kernel 920 acts as an abstraction layer between the hardware and the other software layers, consistent with some embodiments. For example, the kernel 920 provides memory management, processor management (e.g., scheduling), component management, networking, and security settings, among other functionality. The services 922 can provide other common services for the other software layers. The drivers 924 are responsible for controlling or interfacing with the underlying hardware. For instance, the drivers 924 can include display drivers, camera drivers, BLUETOOTH® or BLUETOOTH® Low-Energy drivers, flash memory drivers, serial communication drivers (e.g., Universal Serial Bus (USB) drivers), Wi-Fi® drivers, audio drivers, power management drivers, and so forth.

In some embodiments, the libraries 906 provide a low-level common infrastructure utilized by the applications 910. The libraries 906 can include system libraries 930 (e.g., C standard library) that can provide functions such as memory allocation functions, string manipulation functions, mathematic functions, and the like. In addition, the libraries 906 can include API libraries 932 such as media libraries (e.g., libraries to support presentation and manipulation of various media formats such as Moving Picture Experts Group-4 (MPEG4), Advanced Video Coding (H.264 or AVC), Moving Picture Experts Group Layer-3 (MP3), Advanced Audio Coding (AAC), Adaptive Multi-Rate (AMR) audio codec, Joint Photographic Experts Group (JPEG or JPG), or Portable Network Graphics (PNG)), graphics libraries (e.g., an OpenGL framework used to render in two-dimensional (2D) and three-dimensional (3D) in a graphic context on a display), database libraries (e.g., SQLite to provide various relational database functions), web libraries (e.g., WebKit to provide web browsing functionality), and the like. The libraries 906 can also include a wide variety of other libraries 934 to provide many other APIs to the applications 910.

The frameworks 908 provide a high-level common infrastructure that can be utilized by the applications 910. For example, the frameworks 908 provide various GUI functions, high-level resource management, high-level location services, and so forth. The frameworks 908 can provide a broad spectrum of other APIs that can be utilized by the applications 910, some of which may be specific to a particular operating system 904 or platform.

In an example embodiment, the applications 910 include a home application 950, a contacts application 952, a browser application 954, a book reader application 956, a location application 958, a media application 960, a messaging application 962, a game application 964, and a broad assortment of other applications, such as a third-party application 966. The applications 910 can are programs that execute functions defined in the programs. Various programming languages can be employed to create one or more of the applications 910, structured in a variety of manners, such as object-oriented programming languages (e.g., Objective-C, Java, or C++) or procedural programming languages (e.g., C or assembly language). In a specific example, the third-party application 966 (e.g., an application developed using the ANDROID™ or IOS™ software development kit (SDK) by an entity other than the vendor of the particular platform) may be mobile software running on a mobile operating system such as IOS™, ANDROID™ WINDOWS® Phone, or another mobile operating system. In this example, the third-party application 966 can invoke the API calls 912 provided by the operating system 904 to facilitate functionality described herein.

Figure 10:
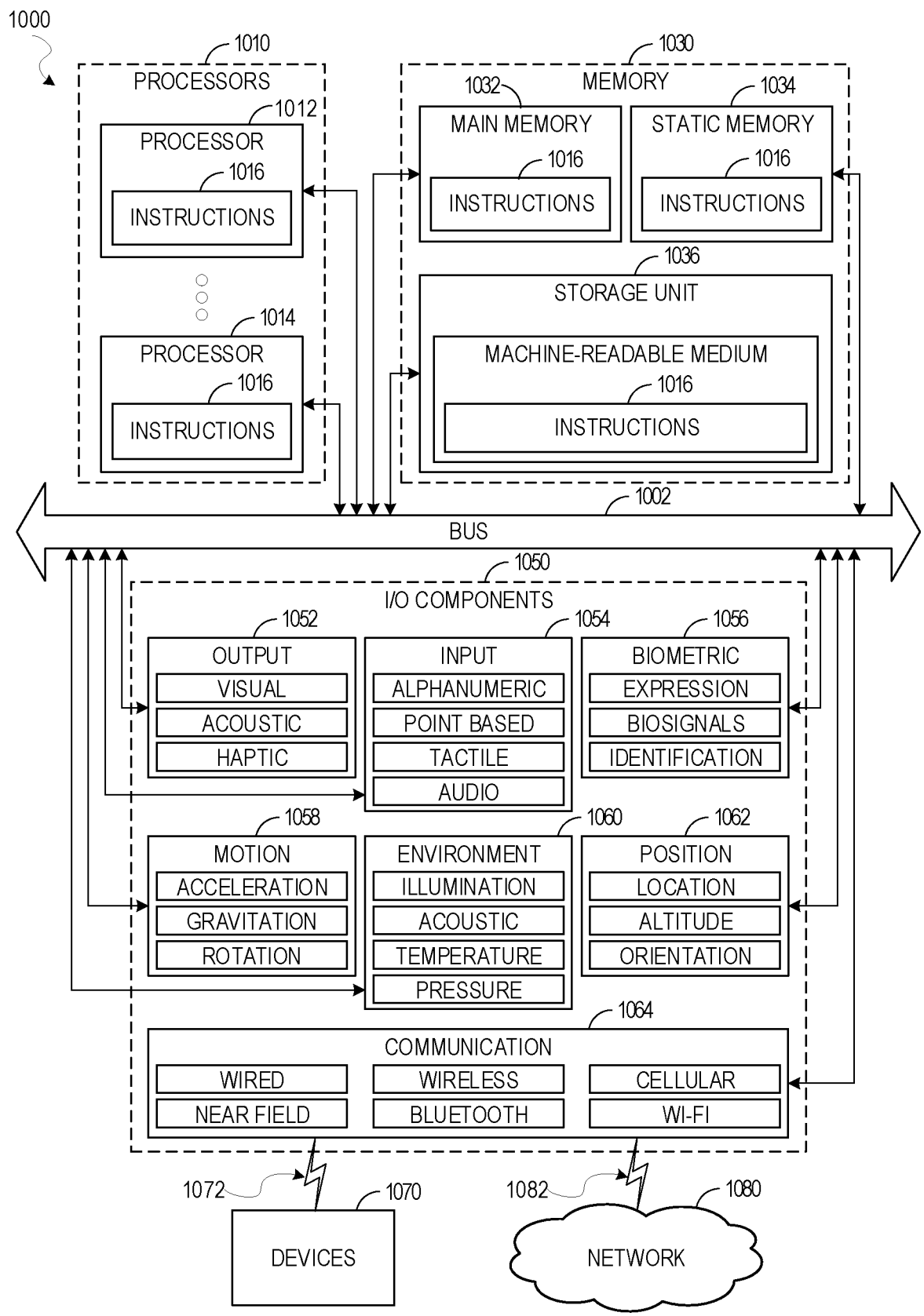
FIG. 10 illustrates a diagrammatic representation of a machine in the form of a computer system within which a set of instructions may be executed for causing the machine to perform any one or more of the methodologies discussed herein.

FIG. 10 illustrates a diagrammatic representation of a machine 1000 in the form of a computer system within which a set of instructions may be executed for causing the machine 1000 to perform any one or more of the methodologies discussed herein. Specifically, FIG. 10 shows a diagrammatic representation of the machine 1000 in the example form of a computer system, within which instructions 1016 (e.g., software, a program, an application, an applet, an app, or other executable code) for causing the machine 1000 to perform any one or more of the methodologies discussed herein may be executed. For example, the instructions 1016 may cause the machine 1000 to execute the methods of FIGS. 5 and 6. Additionally, or alternatively, the instructions 1016 may implement FIGS. 1-6 and so forth. The instructions 1016 transform the general, non-programmed machine 1000 into a particular machine 1000 programmed to carry out the described and illustrated functions in the manner described. In alternative embodiments, the machine 1000 operates as a standalone device or may be coupled (e.g., networked) to other machines. In a networked deployment, the machine 1000 may operate in the capacity of a server machine or a client machine in a server-client network environment, or as a peer machine in a peer-to-peer (or distributed) network environment. The machine 1000 may comprise, but not be limited to, a server computer, a client computer, a personal computer (PC), a tablet computer, a laptop computer, a netbook, a set-top box (STB), a personal digital assistant (PDA), an entertainment media system, a cellular telephone, a smart phone, a mobile device, a wearable device (e.g., a smart watch), a smart home device (e.g., a smart appliance), other smart devices, a web appliance, a network router, a network switch, a network bridge, or any machine capable of executing the instructions 1016, sequentially or otherwise, that specify actions to be taken by the machine 1000. Further, while only a single machine 1000 is illustrated, the term "machine" shall also be taken to include a collection of machines 1000 that individually or jointly execute the instructions 1016 to perform any one or more of the methodologies discussed herein.

The machine 1000 may include processors 1010, memory 1030, and I/O components 1050, which may be configured to communicate with each other such as via a bus 1002. In an example embodiment, the processors 1010 (e.g., a central processing unit (CPU), a reduced instruction set computing (RISC) processor, a complex instruction set computing (CISC) processor, a graphics processing unit (GPU), a digital signal processor (DSP), an application-specific integrated circuit (ASIC), a radio-frequency integrated circuit (RFIC), another processor, or any suitable combination thereof) may include, for example, a processor 1012 and a processor 1014 that may execute the instructions 1016. The term "processor" is intended to include multi-core processors that may comprise two or more independent processors (sometimes referred to as "cores") that may execute instructions 1016 contemporaneously. Although FIG. 10 shows multiple processors 1010, the machine 1000 may include a single processor 1012 with a single core, a single processor 1012 with multiple cores (e.g., a multi-core processor 1012), multiple processors 1012, 1014 with a single core, multiple processors 1012, 1014 with multiple cores, or any combination thereof.

The memory 1030 may include a main memory 1032, a static memory 1034, and a storage unit 1036, each accessible to the processors 1010 such as via the bus 1002. The main memory 1032, the static memory 1034, and the storage unit 1036 store the instructions 1016 embodying any one or more of the methodologies or functions described herein. The instructions 1016 may also reside, completely or partially, within the main memory 1032, within the static memory 1034, within the storage unit 1036, within at least one of the processors 1010 (e.g., within the processor's cache memory), or any suitable combination thereof, during execution thereof by the machine 1000.

The I/O components 1050 may include a wide variety of components to receive input, provide output, produce output, transmit information, exchange information, capture measurements, and so on. The specific I/O components 1050 that are included in a particular machine will depend on the type of machine. For example, portable machines such as mobile phones will likely include a touch input device or other such input mechanisms, while a headless server machine will likely not include such a touch input device. It will be appreciated that the I/O components 1050 may include many other components that are not shown in FIG. 10. The I/O components 1050 are grouped according to functionality merely for simplifying the following discussion, and the grouping is in no way limiting. In various example embodiments, the I/O components 1050 may include output components 1052 and input components 1054. The output components 1052 may include visual components (e.g., a display such as a plasma display panel (PDP), a light-emitting diode (LED) display, a liquid crystal display (LCD), a projector, or a cathode ray tube (CRT)), acoustic components (e.g., speakers), haptic components (e.g., a vibratory motor, resistance mechanisms), other signal generators, and so forth. The input components 1054 may include alphanumeric input components (e.g., a keyboard, a touch screen configured to receive alphanumeric input, a photo-optical keyboard, or other alphanumeric input components), point-based input components (e.g., a mouse, a touchpad, a trackball, a joystick, a motion sensor, or another pointing instrument), tactile input components (e.g., a physical button, a touch screen that provides location and/or force of touches or touch gestures, or other tactile input components), audio input components (e.g., a microphone), and the like.

In further example embodiments, the I/O components 1050 may include biometric components 1056, motion components 1058, environmental components 1060, or position components 1062, among a wide array of other components. For example, the biometric components 1056 may include components to detect expressions (e.g., hand expressions, facial expressions, vocal expressions, body gestures, or eye tracking), measure biosignals (e.g., blood pressure, heart rate, body temperature, perspiration, or brain waves), identify a person (e.g., voice identification, retinal identification, facial identification, fingerprint identification, or electroencephalogram-based identification), and the like. The motion components 1058 may include acceleration sensor components (e.g., accelerometer), gravitation sensor components, rotation sensor components (e.g., gyroscope), and so forth. The environmental components 1060 may include, for example, illumination sensor components (e.g., photometer), temperature sensor components (e.g., one or more thermometers that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensors (e.g., gas detection sensors to detect concentrations of hazardous gases for safety or to measure pollutants in the atmosphere), or other components that may provide indications, measurements, or signals corresponding to a surrounding physical environment. The position components 1062 may include location sensor components (e.g., a Global Positioning System (GPS) receiver component), altitude sensor components (e.g., altimeters or barometers that detect air pressure from which altitude may be derived), orientation sensor components (e.g., magnetometers), and the like.

Communication may be implemented using a wide variety of technologies. The I/O components 1050 may include communication components 1064 operable to couple the machine 1000 to a network 1080 or devices 1070 via a coupling 1082 and a coupling 1072, respectively. For example, the communication components 1064 may include a network interface component or another suitable device to interface with the network 1080. In further examples, the communication components 1064 may include wired communication components, wireless communication components, cellular communication components, near field communication (NFC) components, Bluetooth® components (e.g., Bluetooth® Low Energy), Wi-Fi® components, and other communication components to provide communication via other modalities. The devices 1070 may be another machine or any of a wide variety of peripheral devices (e.g., coupled via a USB).

Moreover, the communication components 1064 may detect identifiers or include components operable to detect identifiers. For example, the communication components 1064 may include radio-frequency identification (RFID) tag reader components, NFC smart tag detection components, optical reader components (e.g., an optical sensor to detect one-dimensional bar codes such as Universal Product Code (UPC) bar code, multi-dimensional bar codes such as QR code, Aztec code, Data Matrix, Dataglyph, MaxiCode, PDF417, Ultra Code, UCC RSS-2D bar code, and other optical codes), or acoustic detection components (e.g., microphones to identify tagged audio signals). In addition, a variety of information may be derived via the communication components 1064, such as location via Internet Protocol (IP) geolocation, location via Wi-Fi® signal triangulation, location via detecting an NFC beacon signal that may indicate a particular location, and so forth.

The various memories (i.e., 1030, 1032, 1034, and/or memory of the processor(s) 1010) and/or the storage unit 1036 may store one or more sets of instructions 1016 and data structures (e.g., software) embodying or utilized by any one or more of the methodologies or functions described herein. These instructions (e.g., the instructions 1016), when executed by the processor(s) 1010, cause various operations to implement the disclosed embodiments.

As used herein, the terms "machine-storage medium," "device-storage medium," and "computer-storage medium" mean the same thing and may be used interchangeably. The terms refer to a single or multiple storage devices and/or media (e.g., a centralized or distributed database, and/or associated caches and servers) that store executable instructions and/or data. The terms shall accordingly be taken to include, but not be limited to, solid-state memories, and optical and magnetic media, including memory internal or external to processors. Specific examples of machine-storage media, computer-storage media, and/or device-storage media include non-volatile memory, including by way of example semiconductor memory devices, e.g., erasable programmable read-only memory (EPROM), electrically erasable programmable read-only memory (EEPROM), field-programmable gate array (FPGA), and flash memory devices; magnetic disks such as internal hard disks and removable disks; magneto-optical disks; and CD-ROM and DVD-ROM disks. The terms "machine-storage media," "computer-storage media," and "device-storage media" specifically exclude carrier waves, modulated data signals, and other such media, at least some of which are covered under the term "signal medium" discussed below.

In various example embodiments, one or more portions of the network 1080 may be an ad hoc network, an intranet, an extranet, a virtual private network (VPN), a local-area network (LAN), a wireless LAN (WLAN), a wide-area network (WAN), a wireless WAN (WWAN), a metropolitan-area network (MAN), the Internet, a portion of the Internet, a portion of the public switched telephone network (PSTN), a plain old telephone service (POTS) network, a cellular telephone network, a wireless network, a Wi-Fi® network, another type of network, or a combination of two or more such networks. For example, the network 1080 or a portion of the network 1080 may include a wireless or cellular network, and the coupling 1082 may be a Code Division Multiple Access (CDMA) connection, a Global System for Mobile communications (GSM) connection, or another type of cellular or wireless coupling. In this example, the coupling 1082 may implement any of a variety of types of data transfer technology, such as Single Carrier Radio Transmission Technology (1×RTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth generation wireless (4G) networks, Universal Mobile Telecommunications System (UMTS), High-Speed Packet Access (HSPA), Worldwide Interoperability for Microwave Access (WiMAX), Long-Term Evolution (LTE) standard, others defined by various standard-setting organizations, other long-range protocols, or other data transfer technology.

The instructions 1016 may be transmitted or received over the network 1080 using a transmission medium via a network interface device (e.g., a network interface component included in the communication components 1064) and utilizing any one of a number of well-known transfer protocols (e.g., Hypertext Transfer Protocol (HTTP)). Similarly, the instructions 1016 may be transmitted or received using a transmission medium via the coupling 1072 (e.g., a peer-to-peer coupling) to the devices 1070. The terms "transmission medium" and "signal medium" mean the same thing and may be used interchangeably in this disclosure. The terms "transmission medium" and "signal medium" shall be taken to include any intangible medium that is capable of storing, encoding, or carrying the instructions 1016 for execution by the machine 1000, and include digital or analog communications signals or other intangible media to facilitate communication of such software. Hence, the terms "transmission medium" and "signal medium" shall be taken to include any form of modulated data signal, carrier wave, and so forth. The term "modulated data signal" means a signal that has one or more of its characteristics set or changed in such a manner as to encode information in the signal.

The terms "machine-readable medium," "computer-readable medium," and "device-readable medium" mean the same thing and may be used interchangeably in this disclosure. The terms are defined to include both machine-storage media and transmission media. Thus, the terms include both storage devices/media and carrier waves/modulated data signals.

What is claimed is:

1. A system comprising:
   at least one hardware processor; and
   a non-transitory computer-readable medium storing instructions that, when executed by the at least one hardware processor, cause the at least one hardware processor to perform operations comprising:
   executing a first logic processing software robot contained in a logic layer of a process assembly line, the execution of the first logic processing software robot causing a first set of one or more processes learned via first previous user interaction data to be executed;
   causing the first logic processing software robot to make a call to a second logic processing software robot contained in the logic layer of the process assembly line, to cause execution of a second set of one or more processes learned via second previous user interaction data to be executed;
   upon an error occurring during the execution of the first logic processing software robot or the second logic processing software robot, causing an alert to be generated to an alert software robot contained in an acknowledgement layer of the process assembly line;
   upon the alert software robot receiving the alert, causing the alert software robot to send the alert to a user; and
   collecting, at a status and response software robot contained in a status layer of the process assembly line, data from the first logic processing software robot, the second logic processing software robot, and the alert software robot and providing a search service allowing software robots to query the data.

2. The system of claim 1, wherein the operations further comprise:
   executing a first intelligent software robot contained in the logic layer of the process assembly line, the execution of the first intelligent software robot causing running of a machine learned model; and
   causing the first intelligent software robot to trigger execution of the first logic processing software robot.

3. The system of claim 1, wherein the operations further comprise:
   causing the second logic processing software robot to trigger execution of a data validation and compliance software robot contained in the logic processing layer of the process assembly line, the execution of the validation and compliance software robot causing one or more data validation operations to be performed.

4. The system of claim 1, wherein at least one of the software robots supports Application Program Interface (API) calling to an external application.

5. The system of claim 1, wherein at least one of the software robots supports user interface controlling.

6. The system of claim 4, wherein the external application is an in-memory database.

7. The system of claim 4, wherein the external application is procurement and supply chain software.

8. A method comprising:
   executing a first logic processing software robot contained in a logic layer of a process assembly line, the execution of the first logic processing software robot causing a first set of one or more processes learned via first previous user interaction data to be executed;
   causing the first logic processing software robot to make a call to a second logic processing software robot contained in the logic layer of the process assembly line, to cause execution of a second set of one or more processes learned via second previous user interaction data to be executed;
   upon an error occurring during the execution of the first logic processing software robot or the second logic processing software robot, causing an alert to be generated to an alert software robot contained in an acknowledgement layer of the process assembly line;
   upon the alert software robot receiving the alert, causing the alert software robot to send the alert to a user; and
   collecting, at a status and response software robot contained in a status layer of the process assembly line, data from the first logic processing software robot, the second logic processing software robot, and the alert software robot and providing a search service allowing software robots to query the data.

9. The method of claim 8, further comprising:
   executing a first intelligent software robot contained in the logic layer of the process assembly line, the execution of the first intelligent software robot causing running of a machine learned model; and
   causing the first intelligent software robot to the first logic processing software robot.

10. The method of claim 8, further comprising:
    causing the second logic processing software robot to a data validation and compliance software robot contained in the logic processing layer of the process assembly line, the execution of the validation and compliance software robot causing one or more data validation operations to be performed.

11. The method of claim 8, wherein at least one of the software robots supports Application Program Interface (API) calling to an external application.

12. The method of claim 8, wherein at least one of the software robots supports user interface controlling.

13. The method of claim 11, wherein the external application is an in-memory database.

14. The method of claim 11, wherein the external application is procurement and supply chain software.

15. A non-transitory machine-readable medium storing instructions which, when executed by one or more processors, cause the one or more processors to perform operations comprising:
    executing a first logic processing software robot contained in a logic layer of a process assembly line, the execution of the first logic processing software robot causing a first set of one or more processes learned via first previous user interaction data to be executed;
    causing the first logic processing software robot to make a call to a second logic processing software robot contained in the logic layer of the process assembly line, to cause execution of a second set of one or more processes learned via second previous user interaction data to be executed;
    upon an error occurring during the execution of the first logic processing software robot or the second logic processing software robot, causing an alert to be generated to an alert software robot contained in an acknowledgement layer of the process assembly line;
    upon the alert software robot receiving the alert, causing the alert software robot to send the alert to a user; and
    collecting, at a status and response software robot contained in a status layer of the process assembly line, data from the first logic processing software robot, the second logic processing software robot, and the alert software robot and providing a search service allowing software robots to query the data.

16. The non-transitory machine-readable medium of claim 15, wherein the operations further comprise:
- executing a first intelligent software robot contained in the logic layer of the process assembly line, the execution of the first intelligent software robot causing running of a machine learned model; and
- causing the first intelligent software robot to trigger execution of the first logic processing software robot.

17. The non-transitory machine-readable medium of claim 15, wherein the operations further comprise:
- causing the second logic processing software robot to trigger execution of a data validation and compliance software robot contained in the logic processing layer of the process assembly line, the execution of the validation and compliance software robot causing one or more data validation operations to be performed.

18. The non-transitory machine-readable medium of claim 15, wherein at least one of the software robots supports Application Program Interface (API) calling to an external application.

19. The non-transitory machine-readable medium of claim 15, wherein at least one of the software robots supports user interface controlling.

20. The non-transitory machine-readable medium of claim 18, wherein the external application is an in-memory database.

* * * * *